United States Patent [19]

Monch

[11] Patent Number: 4,972,712
[45] Date of Patent: Nov. 27, 1990

[54] MOUNTING APPARATUS FOR MOUNTING A ROTARY MEMBER ON UNBALANCE MEASURING MACHINE

[75] Inventor: Uwe Monch, Pfungstadt, Fed. Rep. of Germany

[73] Assignee: Hofmann Werkstatt-Technik GmbH, Pfungstadt, Fed. Rep. of Germany

[21] Appl. No.: 385,538

[22] Filed: Jul. 26, 1989

[30] Foreign Application Priority Data

Aug. 2, 1988 [DE] Fed. Rep. of Germany ....... 3826185

[51] Int. Cl.[5] ............................................. G01M 1/02
[52] U.S. Cl. ......................................... 73/462; 73/473
[58] Field of Search ................. 73/460, 462, 471–479, 73/487

[56] References Cited

U.S. PATENT DOCUMENTS 4,254,658 3/1981 Kogler et al. .......................... 73/462
4,445,372 5/1984 Buzzi ..................................... 73/462

Primary Examiner—John Chapman
Attorney, Agent, or Firm—Cushman, Darby & Cushman

[57] ABSTRACT

A mounting apparatus for mounting a rotary member such as a motor vehicle wheel to a drive shaft of an unbalance measuring arrangement includes a stationary measuring spindle for rotatably carrying the rotary member bearings which are part of the rotary member itself. An entrainment hub which can be drivingly coupled to the drive shaft of the unbalance measuring apparatus supports the measuring spindle rotatably relative thereto, and engages the rotary member to drive it in rotation. The measuring spindle is prevented from rotating with the entrainment hub by a restraining device.

9 Claims, 1 Drawing Sheet

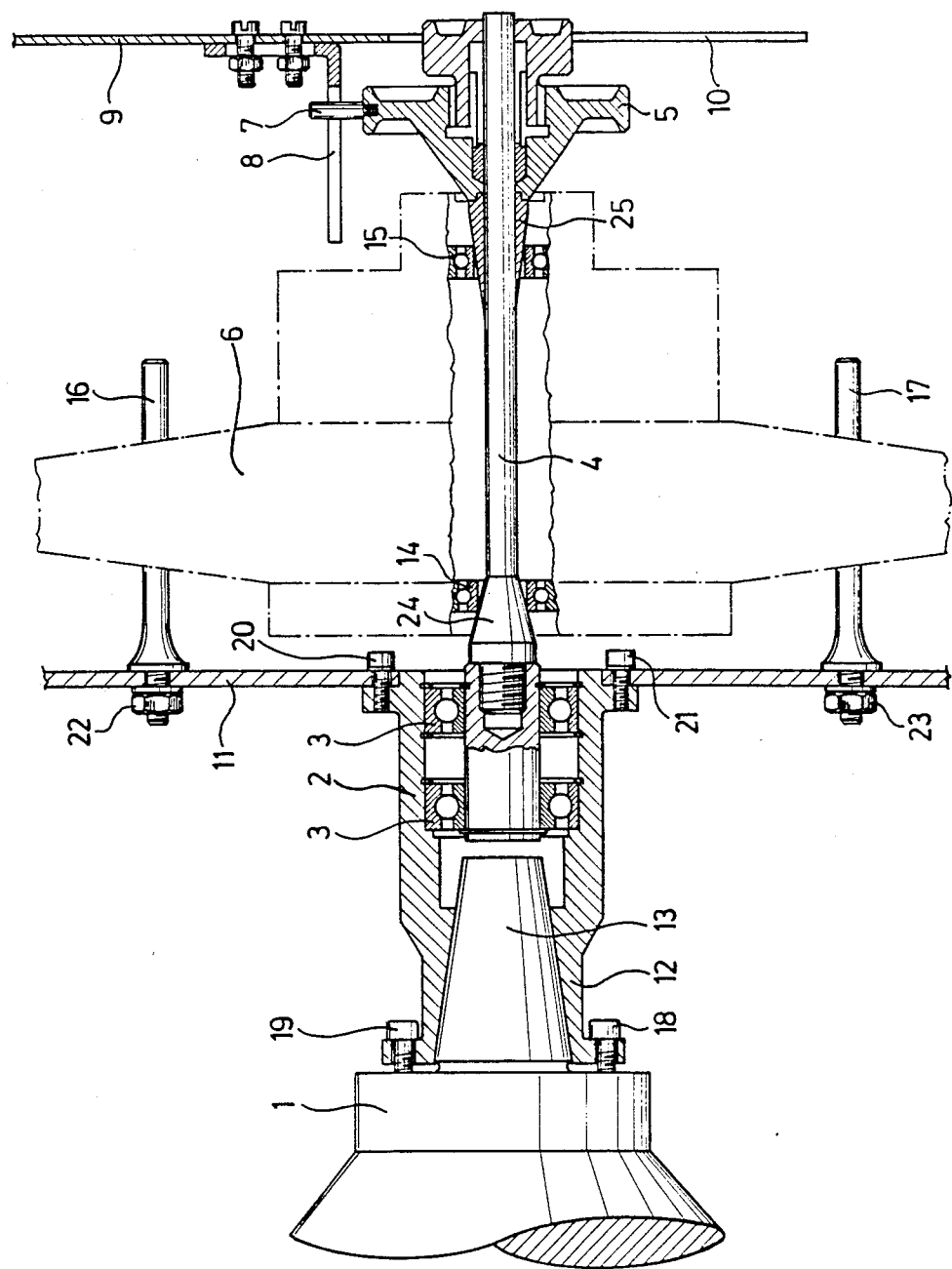

MOUNTING APPARATUS FOR MOUNTING A ROTARY MEMBER ON UNBALANCE MEASURING MACHINE

BACKGROUND OF THE INVENTION

The present invention concerns a mounting apparatus for mounting a rotary member such as a motor vehicle wheel to a drive means of an unbalance measuring arrangement, for the purposes of measuring any unbalance of the rotary member.

A mounting apparatus for clamping a rotary member to the drive means of an unbalance measuring arrangement to carry out an unbalance measuring operation on the rotary member, as disclosed in U.S. Pat. No. 4,254,658, comprises an axle or spindle which is stationary during the measuring run and which can be fixedly connected to a shaft of the drive means of the unbalance measuring arrangement. The drive means comprises a hub which is mounted on its shaft while the mounting apparatus has an entrainment disc which can in turn be connected to the hub on the shaft of the drive means, for example by flange configurations and fixing screws. The spindle of the printing apparatus projects through a central bore in the entrainment disc so that the rotary member, the unbalance of which is to be measured, can be fitted on to the spindle of the mounting apparatus by means of bearing assemblies which are carried in the rotor itself, whereby the rotor is mounted rotatably relative to the stationary spindle of the clamping apparatus, for performing the measuring run. The spindle of the mounting apparatus may be of a suitable configuration for receiving the rotary member, and an additional centering portion may also be fitted on to and then fixed on the spindle of the mounting apparatus, to hold the member rotatably in a centered condition on the spindle. Members on the entrainment disc then engage the rotary member to produce the rotary movement thereof, for example if the rotary member is in the form of a spoked wheel, the entrainment disc can carry entrainment pins which are secured thereto in such a way as to project in the axial direction of the rotary member, through the spaces between spokes thereof, so that when the hub of the drive means is driven in rotation by a drive motor, the rotary member is also rotated.

That mounting apparatus can be used for measuring unbalance of rotary which can only be fitted on to relatively thin mounting members, that is to say the fixed spindle referred to above, which is a thin spindle. The rotary members in that respect are more particularly those which are fitted on to the spindle of the mounting apparatus by means of their own bearing assemblies. Members of that nature are, for example, spoked wheels such as motorcycle wheels. The above-discussed apparatus makes it possible for members of that kind which are relatively heavy in relation to the bending strength of the thin spindle on which they are mounted to be measured in respect of unbalance thereof, without flexing and bending of the mounting spindle causing the measurement values obtained to be falsified. However that apparatus does require a specific configuration in respect of the drive means, with a hub which rotates about the shaft of the drive means and to which the mounting apparatus is suitably connected.

SUMMARY OF THE INVENTION

An object of the present invention is to provide a mounting apparatus for mounting a rotary member in position on an unbalance measuring arrangement, which does not require a drive means of a specifically adapted configuration.

Another object of the present invention is to provide a mounting apparatus for mounting a rotary member in position for an unbalance measuring operation, which enjoYs greater versatility of use in relation to an unbalance measuring arrangement on which it is to be used.

Still another object of the present invention is to provide a clamping apparatus for holding a rotary member in position for an unbalance measuring operation in respect thereof, which provides enhanced structural rigidity to at least reduce falsification of measurement results in operation thereof.

In accordance with the present invention those and other objects are achieved by a mounting apparatus for mounting a rotary member such as a motor vehicle wheel to a drive means of an unbalance measuring arrangement such as a balancing machine, to carry out an unbalance measuring operation thereon. The mounting apparatus comprises a measuring axle or spindle which is adapted to be fixed to the unbalance measuring arrangement and which is stationary during an unbalance measuring run. The rotary member such as a motor vehicle wheel, in respect of which unbalance is to be measured, can be fitted on to the measuring spindle in centered relationship therewith and rotatably thereon. The mounting apparatus further comprises an entrainment means which is mounted rotatably relative to the measuring spindle and which is adapted to be driven in rotation by the drive means of the unbalance measuring arrangement. The rotary member is thus driven in rotation by the rotary movement of the entrainment means. The entrainment means is mounted rotatably on the measuring spindle the measuring spindle is prevented from rotating therewith by restraining means which is stationary at least during an unbalance measuring run.

Thus the measuring spindle is supported by the unbalance measuring arrangement, more specifically by a shaft thereof, but is prevented from rotating therewith by the above-mentioned restraining means so that the spindle remains stationary, the rotary member being rotated thereon by the entrainment means which is preferably in the form of an entrainment disc. The restraining means may comprise a stop member carried on the measuring spindle, and an abutment member which is disposed at a stationary location, for example being fixed to a part of the frame structure of the apparatus, with the stop member on the measuring spindle co-operating with the abutment member to prevent the measuring spindle from rotating. For example, the measuring spindle may carry a centering member for centering the rotary member on the measuring spindle, and the stop member may be secured to the centering member. The stationary abutment member with which the stop member on the n' measuring spindle co-operates to prevent the measuring spindle from rotating may be carried on a protective hood which is pivoted into a position of covering the rotary member during the measuring run.

The invention thus provides a mounting apparatus for mounting a rotary member in position on an unbalance measuring arrangement such as a balancing machine, with the mounting apparatus being independent of the configuration of the part of the drive means of the unbalance measuring arrangement, to which the mounting apparatus is to be coupled for the measuring operation.

In particular the mounting apparatus in accordance with the present invention may be readily adapted and coupled to conventional measuring spindles and shafts of a normal configuration and which are thus in the form of solid shafts, in normal unbalance measuring arrangements such as balancing machines.

In a preferred feature of the invention the entrainment means of the apparatus comprises an entrainment hub which is mounted on the measuring spindle by way of rolling bearing assemblies such as ball bearing assemblies. To ensure proper axial alignment of the mounting apparatus and the unbalance measuring arrangement, the hub of the mounting apparatus may comprise a centering portion which is adapted to co-operate with a centering portion of corresponding configuration on the drive shaft of the drive means of the unbalance measuring arrangement.

For the purposes of coupling the entrainment means to the drive shaft of the drive means, the entrainment hub may be secured to the drive shaft of the drive means by a flange configuration with fixing screws. It is also possible however to use other suitable clamping or fixing means with which the entrainment hub is suitably secured to the drive means.

To carry out a measuring operation, the rotary member, the unbalance of which is to be measured, is mounted on the measuring spindle of the mounting apparatus by means of the bearings in the rotary member such as ball bearing assemblies. The rotary member is preferably mounted on the measuring spindle by means of a centering portion disposed at the end of the measuring spindle which is towards the drive means, and a further centering portion which is fitted on to the measuring spindle adjacent the end thereof which is remote from the drive means. The centering portions comprise centering tapers of suitable shape to co-operate with the center hole in the rotary member to be mounted on the measuring spindle, or the bearing assemblies carried in the center hole of the rotary member.

In order for the rotary member to be rotated during the measuring operation, the entrainment means may comprise an entrainment disc secured to the above-mentioned entrainment hub. The entrainment disc may carry entrainment projections such as pins which engage into spaces between spokes of the rotary member when the rotary member is a spoked wheel such as a motor cycle wheel. If the rotary member is of a different configuration, the entrainment disc may also carry projections which can be pressed against a contact surface of the rotary member, thereby to drive the rotary member in rotation. It is also possible for the entrainment disc to be provided with projections capable of engaging the rotary member to drive it in rotation. As indicated above, the rotary member rotates on its own bearing assemblies with the entrainment means, the measuring spindle and the centering portions forming a unit which can be suitably coupled to the drive means of the unbalance measuring apparatus by way of the entrainment means.

Further objects, features and advantages of the construction in accordance with the principles of the present invention will be more clearly apparent from the following description o±a preferred embodiment thereof.

BRIEF DESCRIPTION OF THE DRAWING

The single FIGURE of the accompanying drawing shows an embodiment of a mounting apparatus in accordance with the invention.

DESCRIPTION OF THE PREFERRED EMBODIMENT

Referring to the drawing, shown therein is a mounting apparatus for mounting a rotary member, an unbalance of which is to be measured, such as a motor vehicle wheel, for example a motor cycle wheel, to the drive means of an unbalance measuring arrangement such as a balancing machine. Reference numeral 1 in the drawing identifies a conventional drive shaft or spindle of a balancing machine, the remainder of which is not shown in the drawing but which will be of generally conventional configuration.

The mounting apparatus according to the invention comprises a measuring spindle 4 which, at its end towards the left in the drawing, comprises two rolling bearing assemblies illustrated in the form of ball bearing assemblies 3, for an entrainment hub 2. In that way the entrainment hub 2 and the measuring spindle 4 are connected together in such a way as to permit relative rotary movement therebetween.

The entrainment hub 2 comprises a centering portion 12 which forms an internal taper configuration. The internal taper configuration of the centering portion 12 matches a centering portion 13 which is of a correspondingly tapered shape on the shaft 1 of the balancing machine. If the drive shaft 1 of the balancing machine is cylindrical, then the centering portion 12 of the entrainment hub 2 is of a suitable configuration.

In the illustrated embodiment, the left-hand end of the entrainment hub 2 has a flange and the entrainment hub 2 is thus secured to the drive shaft 1 by means of the flange and screws 18 and 19 which pass through holes in the flange and are screwed into the drive shaft 1. At the other end of the entrainment hub 2, which is towards the right in the drawing, an entrainment disc 11 is secured to a fixing flange formed on the entrainment hub 2, also by means of screws indicated at 20 and 21. The entrainment 11 carries entrainment projections illustrated in the form of entrainment pins 16 and 17 which are fixed in bores in the entrainment disc 11 by screw means indicated at 22 and 23. The entrainment pins 16 and 17 can thus extend through the spaces between spokes, or through other openings, in a rotary member 6 to be measured, for example a spoked wheel.

The rotary member 6 is rotatably mounted on the measuring spindle 4 by way of its own rolling bearing assemblies which are shown here in the form of ball bearing assemblies 14 and 15. The outside peripheral surface of the measuring spindle 4 can be of a suitable configuration to carry the rotary member 6. In particular, to mount the rotary member 6 on the measuring spindle 4, the measuring spindle 4 may have a tapered centering portion 24 which cooperates with the inner track ring of the ball bearing assembly 14 in the manner illustrated in the drawing. Carried on the end portion of the measuring spindle 4, which is remote from the entrainment hub 2, is a centering member 5 which, as can be seen from the drawing, carries a tapering centering and holding portion 25 which thus extends into the ball bearing assembly 15 from the right-hand side of the assembly, as viewing in the drawing. The tapering portion 24 and the tapering portion 25 thus provide for centering the rotary member 6 on the measuring spindle 4, and also defining the appropriate position thereof, in the axial direction of the measuring spindle 4. Thus, the centering member 5 can provide that, when it is fixed on the end of the measuring spindle 4, it urges the tapering portion 25 in the axial direction into the interior of the ball bearing assembly 15 of the rotary member 6, so that the rotary member 6 is urged towards the left in the drawing and thus causes the ball bearing assembly 14 thereof to be pressed firmly against the tapering portion 24 provided on the measuring spindle) 4. That provides that the two ball bearing assemblies 14 and 15 in the center hole in the rotary member 6 are fixedly positioned by way of their inner track races on the measuring spindle 4, so as to ensure that the ball bearing assemblies 14 and 15 and therewith the rotary 6 are satisfactorily centered and fixed on the measuring spindle. It will be seen from the foregoing that the rotary member 6 is thus rotatably mounted on the measuring spindle 4, by means of the bearing assemblies of the rotor itself.

So that the measuring spindle which is thus rotatably supported at its left-hand end by the entrainment hub 2 is held stationary during a measuring operation, the illustrated construction comprises a stop member 7 which is fixed to the centering member 5. The stop member 7 is in the form of a radially projecting pin which is screwed into the centering member 5. The illustrated construction also comprises an abutment member 8 in the form of an angle member which is screwed to a fixed part of the structure of the apparatus, more specifically a protective hood 9. The protective hood 9 is pivotably mounted to the housing of the unbalance measuring arrangement or the balancing machine, and is pivoted into a position over the rotary member 6, during a measuring operation. In that condition the protective hood 9 is in the position shown in the FIGURE in which the stop member 7 comes to bear against the abutment member 8 at the beginning of the measuring run. Thus, when starting the measuring operation, the measuring spindle 4 rotates about its axis, under the drive effect of the entrainment hub 2, through an angular distance from its starting position until the stop member 7 comes to bear against the abutment member 8 and then stops rotating. The stop member 7 and the abutment member 8 thus co-operate to provide a restraining means to prevent the measuring spindle 4 from rotating during the measuring run.

The end of the measuring spindle 4 on which the centering member 5 is carried projects into an opening 10 in the protective hood 9.

To perform a measuring operation, the drive shaft 1 of the unbalance measuring arrangement is rotated by a drive motor (not shown) about its axis which is aligned with the axis of the measuring spindle 4. In that way the entrainment hub 2 and therewith the entrainment disc 11 with the entrainment pins 16 and 17 secured thereto are also driven in rotation. The entrainment pins 16 and 17 which are in engagement with the rotary member 6 also drive the rotary member 6 in rotation, with the rotary member 6 rotating on its own ball bearing assemblies 14 and 15. As indicated above, the measuring spindle is prevented from being driven in rotation, so that it is stationary during the measuring run, by the co-operation of the stop member 7 and the abutment member 8.

The rotary member 6 is prevented from being displaced axially on the measuring spindle 4 by the holding action provided by the cooperation of the tapering portions 24 and 25 and the ball bearing assemblies 14 and 15. The entrainment hub 2 is also prevented from axial displacement by means of the ball bearing assemblies 3. The measuring operation does not involve any falsification of measurement values, which could occur due to tending or flexing of the measuring spindle 4.

The entrainment hub 2 may be of such a configuration that it can be coupled to any form of drive shaft, so that the illustrated mounting apparatus is universal in its use. The mounting apparatus can also be easily fitted to conventional balancing machines.

It will be appreciated that the above-described mounting apparatus has been set forth solely by way of example and illustration of the principles of the present invention and that various modifications and alterations may be made therein without thereby departing from the spirit and scope of the invention.

I claim:

1. A mounting apparatus for mounting a rotary member to a drive means of an unbalance measuring arrangement for measuring unbalance of the rotary member, comprising: a measuring spindle, having first and second ends; means for rotatably mounting the rotary member on the measuring spindle in a centered condition thereon; an entrainment means connectable to the rotary member for driving the rotary member in rotation, the entrainment means including an entrainment hub rotatably mounted on said measuring spindle adjacent to said first end thereof; means for connecting the entrainment means to the drive means; and restraining means operatively positioned adjacent the second end of the measuring spindle for preventing the measuring spindle from rotating during a measuring run.

2. An apparatus as set forth in claim 1 wherein said entrainment means comprises, at least one rolling bearing means rotatably mounting said entrainment hub on said measuring spindle, and means for drivingly connecting said entrainment hub to said drive means.

3. An apparatus as set forth in claim 2 wherein said entrainment hub has a centering means adapted to cooperate with a correspondingly shaped centering means on said drive means.

4. An apparatus as set forth in claim 1 wherein said measuring spindle is of a suitable configuration at its peripheral surface for mounting rolling bearings of said rotary member thereon.

5. An apparatus as set forth in claim 1 wherein said restraining means comprises a stop member carried on said measuring spindle adjacent said second end thereof, and an abutment member which is secured to a part of the unbalance measuring means which is stationary at least during a measuring run and adapted to co-operate with said stop member.

6. An apparatus set forth in claim 5 wherein said stationary part of the unbalance measuring means comprises a protective hood which is carried pivotably on said unbalance measuring means and which is adapted to be pivoted over said rotary member to be measured during the measuring run, and wherein said abutment member is secured to said protective hood.

7. An apparatus as set forth in claim 5 and further comprising a centering means adapted to be fitted on to said second end of said measuring spindle, wherein said stop member is fixed on said centering means.

8. An apparatus as set forth in claim 1 wherein said entrainment means comprises an entrainment hub adapted to be drivingly connected to said drive means, an entrainment disc secured to said entrainment hub, and entrainment portions carried by said entrainment disc and adapted to engage said rotary member to drive same in rotation.

9. An apparatus for mounting a rotary member to a drive means of an unbalance measuring arrangement for measuring unbalance of the rotary member, comprising: an entrainment hub; means on the entrainment hub for drivingly connecting said entrainment hub to said drive means of said unbalance measuring arrangement; entrainment means carried by said entrainment hub and adapted to engage a said rotary member to drive same in rotation; a measuring spindle for rotatably carrying said rotary member; means supporting said measuring spindle in said entrainment hub and adapted to permit relative rotary movement between said entrainment hub and said measuring spindle; and restraining means for preventing said measuring spindle from rotating with said entrainment hub at least during an unbalance measuring operation, the restraining means comprising a stop member carried by said measuring spindle and a stationary abutment member with which said stop member is adapted to co-operate to prevent rotary movement of said measuring spindle.

* * * * *